Jan. 16, 1968                J. E. FUZZELL                3,364,481
            MAGNETICALLY CONTROLLED ROTATING BALL INDICATING DEVICE
Filed June 4, 1965                                 2 Sheets-Sheet 1

INVENTOR.
JOE E. FUZZELL
BY Fryer, Tjensvold, Feix + Phillips
ATTORNEYS

Jan. 16, 1968  J. E. FUZZELL  3,364,481
MAGNETICALLY CONTROLLED ROTATING BALL INDICATING DEVICE
Filed June 4, 1965  2 Sheets-Sheet 2
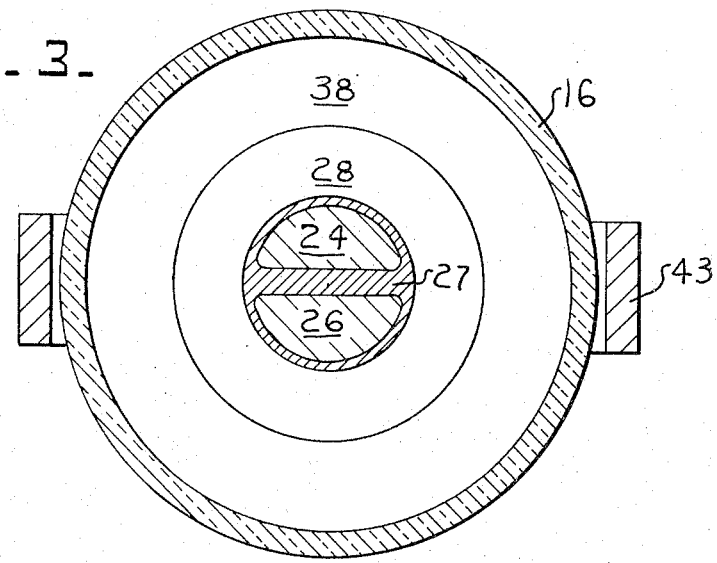
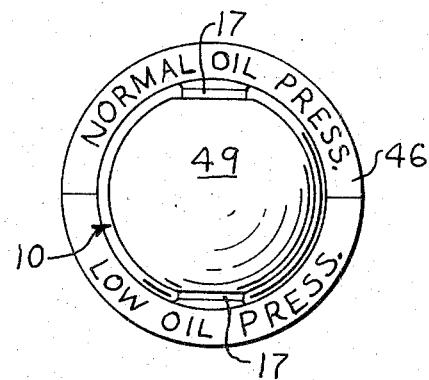
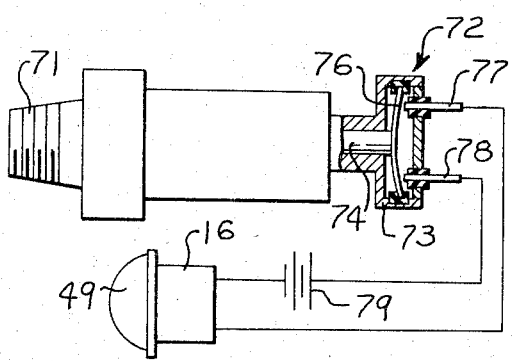
INVENTOR.
BY JOE E. FUZZELL
ATTORNEYS

United States Patent Office 3,364,481
Patented Jan. 16, 1968

3,364,481
MAGNETICALLY CONTROLLED ROTATING
BALL INDICATING DEVICE
Joe E. Fuzzell, Peoria, Ill., assignor to Caterpillar Tractor
Co., Peoria, Ill., a corporation of California
Filed June 4, 1965, Ser. No. 461,375
3 Claims. (Cl. 340—373)

This invention relates to indicating devices generally and more particularly to indicators of the type usually mounted on the dash or indicator panel of motor vehicles, air craft, earth moving equipment or power units and used to indicate to the operator thereof the presence of either favorable or unfavorable conditions in the operational system associated with the device.

In view of the present day mass production and use of complicated and costly powered machinery, it becomes increasingly important, if one is to protect his investments therein, to operate each component operational system only when preferred conditions of pressure, temperature, etc., prevail in the system. For this reason a reliable indicator is a much needed and valuable device.

From the aspect of friction and parts degeneration, the possibility that an indicator will be and will remain accurate over a long period of use usually varies inversely with the number of its constituent working parts. Accordingly, only a minimum number of working parts is used in the indicator of the present invention. Moreover, the present invention does not incorporate parts known likely to physically degenerate through use, such as springs, light bulbs, and bimetallic strips.

Accordingly, it is an object of the present invention to provide a reliable indicating device which has only one moving part.

It is a further object of the present invention to provide an indicator which is directly actuated by electric current to produce a change in the magnetic field linking the fixed part and the rotatable part of the indicator.

It is another object of the present invention to provide an indicator simple to construct, economical to manufacture, and adaptable to indicate changes in temperature, pressure, energy content, etc., in operational systems.

Referring to the drawings:

FIG. 3 is a section taken on the line III—III of FIG. 1;

FIG. 4 is a front elevation of the indicator as it may appear on an indicator panel;

FIG. 6 is a schematic illustration of a pressure switch in association with a pressure line and the indicator of the invention.

Figure 1:
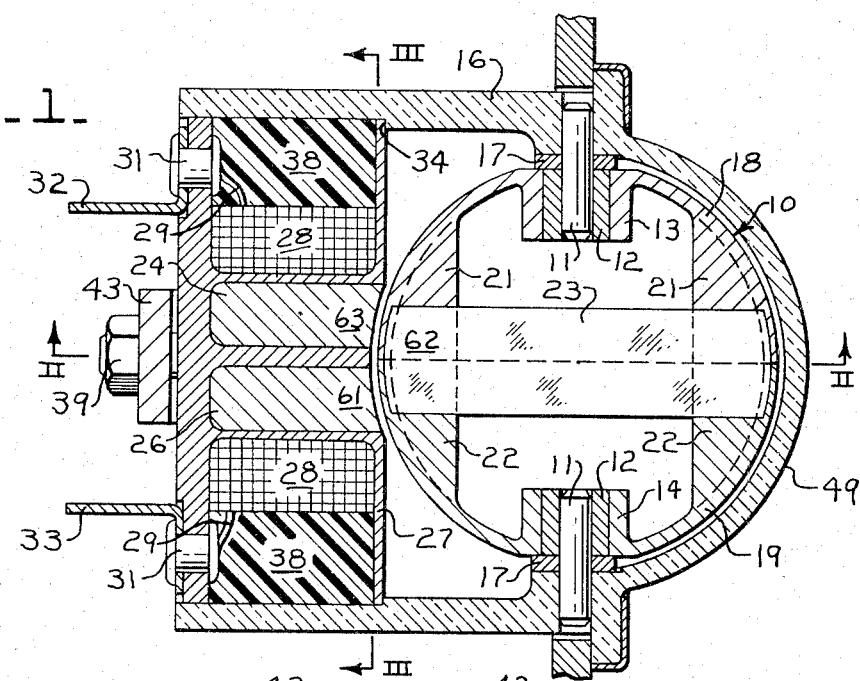
FIG. 1 is a central sectional view of one embodiment of the indicator of the present invention.

Referring now to FIG. 1 for a description of one embodiment of the indicator of the present invention, rotatable means or indicator ball 10 is shown pivotally supported in housing 16 by pins 11 in bearings 12 fitted in the bore of bosses 13 and 14 of the ball. Spacer 17 separates housing 16 from the ball. Ball 10 consists of top half 18 and bottom half 19 each having mating bosses 21 and 22, respectively, recessed to fixedly house permanent magnet 23.

Soft iron core 24 and permanent magnet 26 are fixedly inserted into carrier 27 preferably fabricated from material having electrical insulating properties. Electric coil 28 is wound around a central spool portion of carrier 27. Coil 28 and iron core 24 together form an electromagnet which when electrically energized has a greater magnetomotive force than the permanent magnet 26 insulated from iron core 24 above. Coil leads 29 of coil 28 exit through carrier 27 via rivets 31 which secure coil lead terminals 32 and 33 to carrier 27. Carrier 27 fits into the counterbored portion 34 of the housing.

Figure 2:
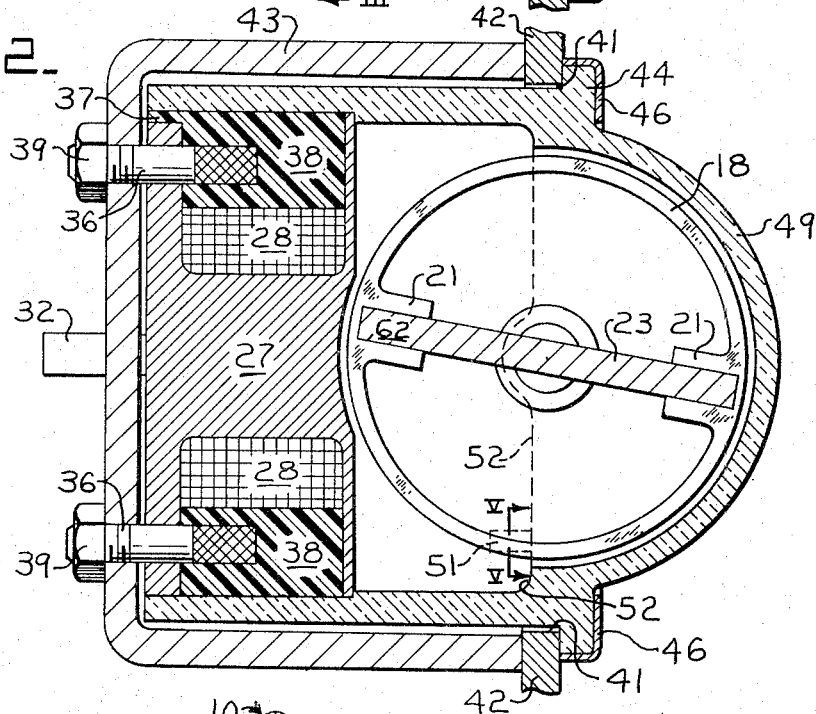
FIG. 2 is a sectional view taken on the line II—II of FIG. 1.

Referring to FIGS. 2 and 3, bolts 36 having knurled ends for increased frictional purposes are inserted into openings in the back portion of carrier 27. Potting material is injected through injection opening 37 to fill the annular opening 38. When cured, the potting material injected into annular opening 38 adheres to the carrier 27 and to the housing 16 thereby further fastening the carrier 27 to the housing. The cured potting material also fastens bolts 36 to carrier 27 and prevents them from rotating when nuts 39 are threaded thereon.

The indicator is inserted into opening 41 of dash or indicator panel 42 normally found in the operator's compartment of, for example, a motor vehicle. The housing is secured to the dash 42 by tightening nuts 39 which causes clamping of the dash between a clamp 43 and a flange 44 on the housing. Face portion 49 of the housing is fabricated from transparent material in order that the operator may see the ball.

Ring 46, also shown in FIG. 4, is detachably secured adjacent flange 44 and circumscribes the transparent face portion 49 of the housing.

Figure 5:
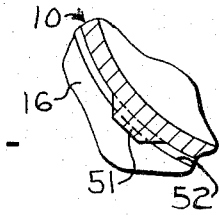
FIG. 5 is a fragmentary section taken on the line V—V of FIG. 2.

Referring to FIGS. 2 and 5, stop 51 which protrudes from and is integral with the ball is shown bearing against co-operating edge 52 rising from the bottom portion of the housing. Stop 51 prevents the ball from rotating counterclockwise from its position in FIG. 2. In so doing, stop 51 prevents the longitudinal axis of permanent magnet 23 from aligning itself parallel to the longitudinal axis of iron core 24 or permanent magnet 26.

Permanent magnets 26 and 23 are so disposed that when the ball is in the position shown in FIGS. 1 and 2, the magnetic pole 61 of magnet 26 is opposite in polarity to the magnetic pole 62 of magnet 23. The ball is, therefore, magnetically urged to remain in the first position as shown in FIGS. 1 and 2.

When coil 28 is electrically energized, electromagnet pole 63 assumes a polarity opposite to magnetic pole 61 and of the same polarity as magnetic pole 62. Since the electromagnet is designed to have a greater magnetomotive force than magnet 26 and since like poles repel, magnetic pole 62, and hence, the ball are magnetically urged to rotate clockwise from the position in FIG. 2 to a second or opposite position, not shown. Stop 51 is instrumental in insuring that the force of repulsion between poles 63 and 62 will, in fact, cause the ball to rotate.

When coil 28 is de-energized the magnetic field of the electromagnet collapses, allowing magnetic poles 61 and 62 and, therefore, the ball to reassume its first position.

The spherical surface of the ball may be colored or otherwise marked in various ways. As an example, the half of the spherical surface of the ball exposed in the first position may be colored green and the other half red. Since red is normally associated with negative or unfavorable conditions, and green with favorable conditions, the operator will be apprised on seeing green that a favorable condition prevails or on seeing red that an unfavorable condition prevails.

To assist the operator in his understanding of the nature of the operational system and whether it is operating in favorable or unfavorable conditions, ring 46 may also be suitably colored or marked. Referring to FIG. 4, the marking on ring 46 designates the indicator as one associated with an oil pressure system. As a further example, the upper half of the ring of FIG. 4 may be colored green and the lower half red. Should such a color scheme be adopted, the appearance of the red spherical surface of the ball through transparent portion 49 would complement the red half of the ring and would indicate to the operator unfavorable conditions. Correspondingly, the appearance of the green spherical surface of the ball would, in conjunction with the green half of ring 46, indicate favorable conditions.

Referring now to FIG. 6, the indicator is schematically shown associated with a nipple 71 in an oil pressure system, not shown. Pressure sensitive switch 72 consists of a housing 73, plunger 74 and a slightly deformed resilient contractor 76. In this schematic illustration upon increase in oil pressure, plunger 74 is forced to move to the right, thereby forcing contractor 76 to bridge contact points 77 and 78. This completes an electrical circuit causing battery 79 to energize coil 28. Upon energization of the electromagnet, the indicator ball is magnetically urged to rotate from its first position to its second position.

While the indicator has been described as having a rotatable indicator ball 10, it is to be understood that the principle of the invention could equally be applied to an indicator having a vertically or horizontally translatable moving part which may contain a permanent magnet and which is adapted to have horizontal or vertical movement between a second permanent magnet substantially colinear with an electromagnet.

I claim:
1. An electromagnetic indicator for indicating the presence of either a first condition or a second condition in an operational system comprising in combination:
   a housing;
   rotatable means pivotably mounted in a transparent portion of the housing between two pivot points on a transverse axis of said housing and rotatable between a first position which is indicative of the first condition present in the system and a second position which is indicative of the second condition present in the system;
   a first permanent bar magnet fixedly secured within said rotatable means equidistant from the two pivot points, the longitudinal axis of the magnet being perpendicular to said transverse axis;
   an electromagnet, consisting of a coil and a core, the electromagnet being axially displaced from said transverse axis interiorly of said housing, wherein the plane developed by the locus of rotation of the longitudinal axis of said first permanent bar magnet underlies and is parallel to a horizontal plane through the longitudinal axis of the core of the electromagnet;
   a second permanent magnet enclosed within the coil of said electromagnet and insulated therefrom, a horizontal plane through the longitudinal axis of which is parallel to and underlies the plane developed by said locus;
   stop means consisting of a promontory on said rotatable means and a cooperating raised portion on said housing adapted to prevent the longitudinal axis of said first permanent bar magnet from aligning itself parallel to the longitudinal axis of the core.

2. The device of claim 1 wherein the magnetic field of said first permanent magnet is such as to attract said second permanent magnet and thus to induce said rotatable means to remain in the first position; and wherein the magnetic field of said electromagnet, when energized, is such as to repel said first permanent magnet and thus to induce said rotatable means to assume the second position.

3. The device of claim 1 further comprising: visual markings on said rotatable means; marking means releasably securable adjacent the transparent portion of said housing and marked to cooperate with said visual markings and adapted to accentuate the indication that either the first or the second condition is present in the system.

References Cited

UNITED STATES PATENTS

| | | | |
|---|---|---|---|
| 2,415,452 | 2/1947 | Taylor et al. | 340—373 X |
| 2,585,974 | 2/1952 | Taylor et al. | 340—373 |
| 2,632,888 | 3/1953 | Brooks et al. | 340—373 |
| 2,740,955 | 4/1956 | Barrett | 340—373 |
| 2,836,773 | 5/1958 | Skrobisch | 340—373 X |
| 3,025,512 | 4/1962 | Bloechl | 340—373 |
| 3,074,060 | 1/1963 | Kadlec | 340—373 |
| 3,103,659 | 10/1963 | Edwards | 340—378 |

JOHN W. CALDWELL, *Primary Examiner.*

NEIL C. READ, *Examiner.*

I. J. LEVIN, H. I. PITTS, *Assistant Examiners.*